United States Patent [19]

McGough

[11] Patent Number: 4,940,296

[45] Date of Patent: * Jul. 10, 1990

[54] PLASTIC HOUSING FOR TELEPHONE PAYSTATION

[76] Inventor: Gerald B. McGough, 2512 Monteview Dr., Huntsville, Ala. 35803

[*] Notice: The portion of the term of this patent subsequent to Jul. 3, 2007 has been disclaimed.

[21] Appl. No.: 308,776

[22] Filed: Feb. 10, 1989

[51] Int. Cl.⁵ .................................................. A47B 81/00
[52] U.S. Cl. ........................................ 312/100; 248/553
[58] Field of Search ................. 70/DIG. 72; 312/100, 312/215, 245, 222; 248/553

[56] References Cited

U.S. PATENT DOCUMENTS

| 4,603,829 | 8/1986 | Koike et al. | 248/553 |
| 4,696,449 | 9/1987 | Woo et al. | 248/553 |
| 4,709,897 | 12/1987 | Mooney | 248/553 |

Primary Examiner—Joseph Falk

[57] ABSTRACT

A plastic housing for a telephone paystation incorporating a new upper housing locking method with modified internal housing construction providing more cost effective design. The housing incorporates a system of locking rods, push bars and a rocker bar all operated in response to a key operated cylinder lock wherein the locking rods are adapted to engage or disengage strike plates secured to the internal portion of a rear housing shell included as a portion of the telephone paystation assembly.

10 Claims, 1 Drawing Sheet

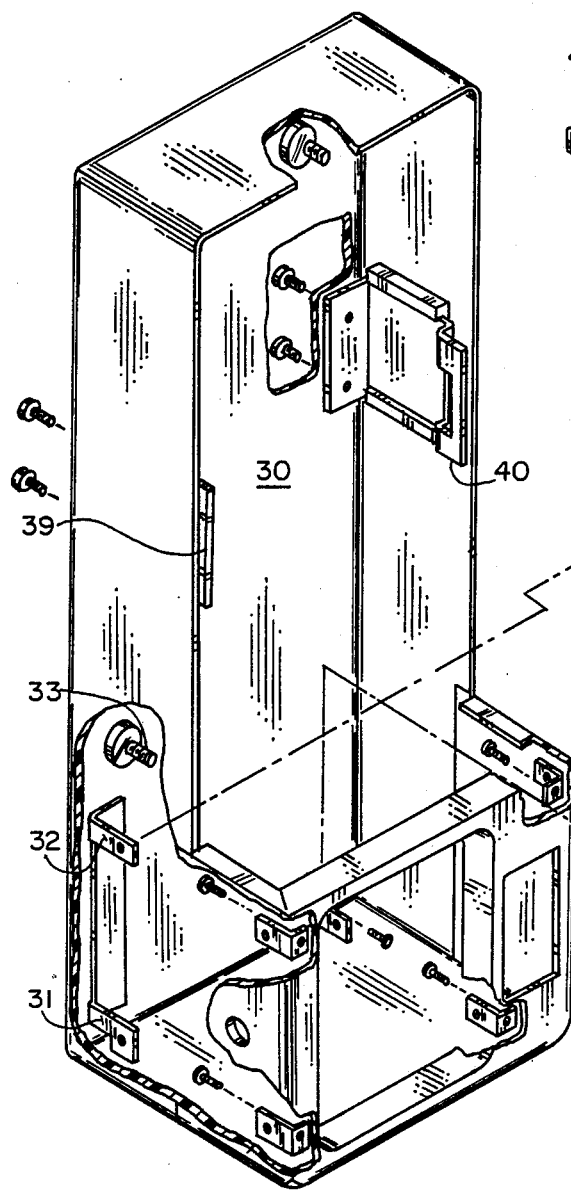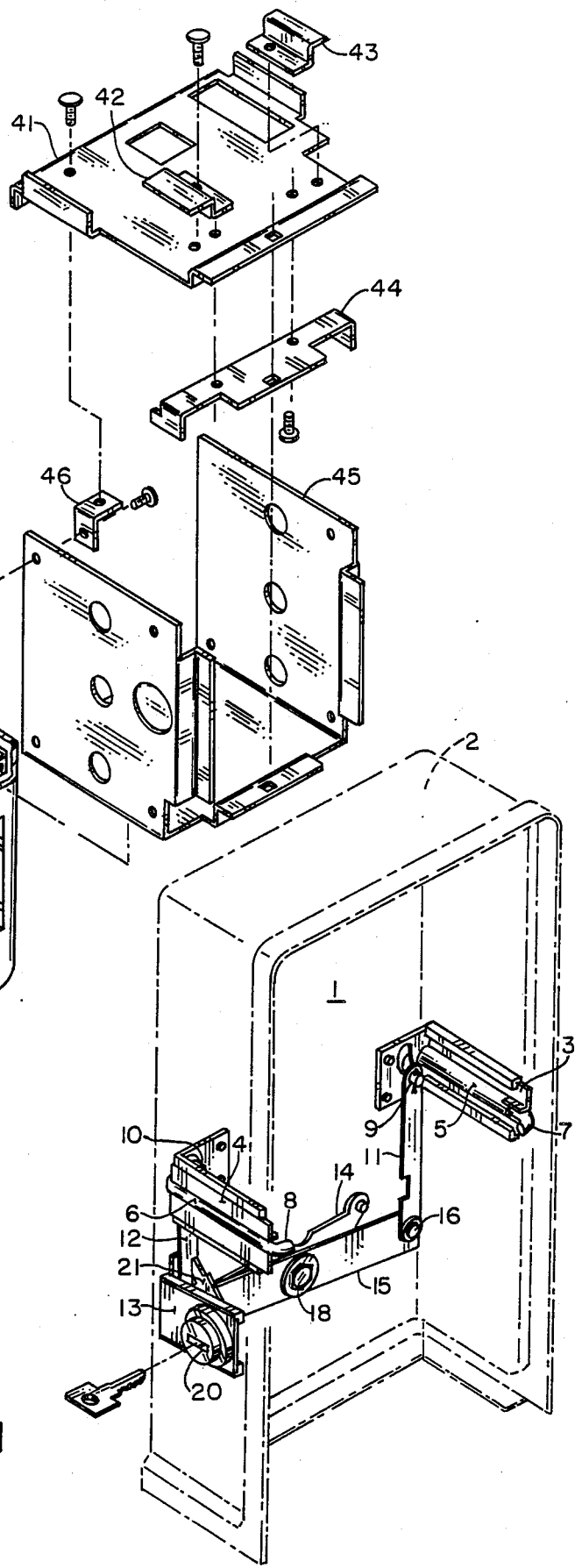
FIG. 2
FIG. 1

PLASTIC HOUSING FOR TELEPHONE PAYSTATION

BACKGROUND OF THE INVENTION

1. Field of the Invention

The present invention relates to the telephone paystations and more particularly to a cost effective, plastic housing assembly for a telephone paystation that retains standard user friendly appearance.

2. Background Art

Both the regulated and deregulated paystation telephone industry have standardized on familiar shaped housings introduced by American Telephone & Telegraph Company over thirty years ago. While other shapes, sizes and constructions were introduced throughout the years, they more or less have dropped out of the picture by virtue of lack of acceptance. It might be concluded that the public and industry perceive the familiar appearance of units as manufactured by AT&T, GTE and Palco Telecom as "user friendly" and exhibit the necessary proven reliability where the appearances of other telephone paystations might be considered as "substandard".

Those present standard housings now available in the paystation market have excellent security attributes. These units were designed to be placed at any street corner and withstand all levels of abuse. Because of their rugged construction, they carry hefty price tags so as to provide this level of security. Many locations, particularly the newer more lucrative ones, such as shopping centers, airports, etc., do not require or wish to provide this same degree of security. Because of their location they are more or less protected by a peopled or locked up environment.

Existing upper housing arrangements on the so-called "standard" paystations utilize sliding locking bars on either side of the upper housing to engage mating strike plates on the rear housing. These locking bars are activated by a "T" type wrench. In the usual arrangement one bar is connected to the other bar by means of a torsion bar on the face of the upper housing. The locking bars are locked in place by the upper housing lock. Other attributes of the standard units include the upper housing having double wall welded construction requiring that the welded assembly be sanded, plated and paint finished. The existing "standard" lower housing construction is a welded double wall assembly with extensive reinforcement with bars and plates. The entire assembly is spot and arc welded, sanded, plated and paint finished. The standard design obviously is expensive because of the many parts it contains, as well as the high amount of welding and finishing labor content. It also should be noted the above design contains many areas of entrapment of plating rinse materials and many areas of inaccessibility by paint. This arrangement creates many failures of the finishing system such as corrosion. Also, because of the many operations of welding, sanding, plating and the inherent problems therein, the rejection rate during manufacturing is usually quite high. At the present time there appear to be no other telephone paystations that appear to be similar to those of the standard design as far as external appearance is concerned but which purpose to change construction or locking methods. All of the known approaches to cost reduction in the past have been by altering both appearance and construction.

SUMMARY OF THE INVENTION

The present invention consists of a plastic housing to provide an alternate lower cost housing for telephone paystations. The end appearance of the housing can be identical to those existing in the marketplace today. Any security sacrificed by the design of the present invention is expected to be minimal. The goals of the present invention are accomplished by a new upper housing locking method, changes in housing reinforcement, and extensive use of bolt together assembly which reduces parts and labor and virtually eliminates finishing operations and reduces the number of rejections during manufacturing.

The housing consists of an upper assembly incorporating a plastic shell including locking rods mounted on opposite vertical sides of the housing wall. By means of an arrangement of push bars connected to the locking bars and a rocker bar pivotally mounted to the housing and engaging both push bars, a cylinder lock cam acts to move the entire assembly and rotates the locking bars in such a manner so to engage or disengage strike plates included in a rear housing shell incorporated into the lower housing assembly. The lower housing assembly includes various mounting brackets, studs and spacers to facilitate bolt or screw together placement and assembly of standard internal subassemblies. Strike plates which provide a portion of the locking arrangement are positioned along either side of the rear housing shell. The upper shell is of molded one piece high impact plastic molding material with a crackle finish. The lower housing consists of plastic rear and back housings ultrasonically welded together. Because of the plastic construction, ultrasonic welding and accessibility of all services, sanding and plating are not required. In the present arrangement the vault mechanism, base and security plate are screwed into the lower housing assembly and to each other in some cases utilizing special brackets. The left and right hand mechanism bar tabs and mechanism base are also screwed into place.

BRIEF DESCRIPTION OF THE DRAWINGS

FIG. 1 is a perspective view including a breakaway section of an upper housing assembly portion of a housing assembly for a telephone paystation in accordance with the present invention.

FIG. 2 is an exploded perspective view of a lower housing assembly including a housing shell, rear shell and some of the internal mounting structures and brackets utilized for support of standard subassemblies in a telephone paystation, in accordance with the present invention.

DESCRIPTION OF THE PREFERRED EMBODIMENTS

The upper housing plastic assembly 1 consists of an outer skin or shell 2 virtually identical in appearance to the standard telephone paystation shell. On both the left and right hand side formed locking rod plates 3 and 4 are captured by notches on the side walls of the housing shell and bolted in place by bolts coming into the housing from the exterior front face. These plates capture the left and right hand locking rods 5 and 6. Mounting bolt heads will be covered and protected by a metal faceplate (not shown) when it is assembled. The rods 5 and 6 are orientated in a front to back axis along the inner sides of the shell 2. Each end of the rods is formed. Ends 7 and 8 are "L" shaped to rotate and lock into the strike plates 39 and 40 of the rear shell portion of the lower housing. The other "U" shaped ends 9 and 10 of the rods form cranks to interface with push bars 11 and 12, respectively, for motion transfer.

Also attached to the upper housing shell is a formed double "D" mounted plate 13 for mounting the upper housing lock 20. It slides into grooves on the side of the housing and is bolted through the face of the housing. These bolts are also protected by the metal faceplate when assembled. Additionally bracket 14 is bolted at approximately the center line face of the shell to provide a pivot point for rocker bar 15 of the locking linkage. Mounting bolts are also protected by the face plate.

Being of plastic the housing will not require sanding and plating or spray finishing.

Push bars 11 and 12 (left and right, respectively) are assembled to the "U" crank ends 9 and 10, respectively, of the locking rods 5 and 6 using cotter pins for attachment. The other end of the push bars 11 and 12 are attached to pins 16 and 17 (not shown) assembled to the rocker bar 15. The rocker bar pivots about a special bearing screw 18 which mounts to bracket 14 bolted to the shell. E-rings are utilized to capture the push bars and retain the push bars 11 and 12 to the studs 16 and 17, respectively.

As noted, the upper housing lock 20 mounts to the double "D" plate 13 utilizing a nut at one side of the upper housing. The lock 20 is operated in response to rotary motion of key 22. Lock 20 is attached to a cam 21 which when rotated engages a notch in push bar 12, thus delivering motion to the entire locking linkage assembly. As push bar 12 goes up, push bar 11 goes down or vice versa. This occurs since one locking rod will rotate clockwise while the other rotates counter clockwise. The rocker bar 15 operates in a see-saw fashion tying the linkage together.

The locked position is with the "L" formed ends 7 and 8 of locking rods 5 and 6 facing inward to engage the strike plates 39 and 40 of the rear housing. The unlocked position on one side has the formed "L" end of the locking rod facing up while on the other side the formed "L" end of the locking then faces down. In either the up or down orientation, the formed "L" ends 7 and 8 will clear the strike plates 39 and 40 for unlocking.

The lower housing shell assembly 30 consists of ultrasonically welded together rear and lower housing shells. These shells include integrally molded in mounting features and are constructed of high impact plastic molding materials. They have a crackle finish to match the upper housing.

Various mounting features such as chassis mounting bracket, coin chute mounting bracket, and spacers are integrally molded into the rear shell. Threaded studs 33 are keyed and inserted from the rear of the shell and protrude on the inside. When the telephone is mounted to the wall the studs are protected.

Strike plates 39 and 40 that interface with the locking rods of the upper housing slide into molded grooves in the lower housing shell and are bolted in place from the back side of the rear shell. When the telephone is mounted to the wall these bolts are protected.

The metal vault and mechanism are identical to those used in my co-pending application entitled "Simplified Metal Housing for Telephone Paystation". They are slid into position between the previously ultrasonically welded together lower and rear housing shells. By use of adapter plates 41 and 45, the vault is bolted to the lower shell. After this assembly, in addition a metal security plate not shown is positioned between the vault and the rear housing locks surface. All three of these metal parts are bolted together. Telephone wall or booth mounting bolts will go through the holes in the metal security plate which align with holes in the rear housing. This will create, with utilization of a standard metal vault door, an all metal coin box vault that is bolted to the wall or booth. The plastic outer shell can be attacked and destroyed but this secure fully metal vault remains guarding the cash vault area.

While but a single embodiment of the present invention has been shown it will be obvious to those skilled in the art that numerous modifications can be made without departing from the spirit of the present invention which shall be limited only by the scope of the claims appended hereto.

What is claimed is:

1. A housing for a telephone paystation comprising:
   an upper housing assembly including a shell of plastic construction;
   first and second locking rods each mounted to an opposite vertical side wall of said upper housing assembly by first and second locking rod plates, respectively;
   first and second push bars each including a first end connected to a first end of said first and second locking rods, respectively;
   a rocker bar pivotally mounted to said upper housing shell, including a first end of said rocker bar connected to a second end of said first push bar and a second end of said rocker bar connected to a second end of said second push bar;
   at least one of said push bars further including a cam receiving slot;
   a key operable cylinder lock mounted in one of said vertical side walls of said upper housing assembly shell;
   said lock further including a cam located internally of said upper housing shell and adapted to engage said slot in said one of said push bars;
   a lower housing assembly including a lower shell; and a rear shell;
   first and second strike plates each mounted to an opposite vertical side wall of said rear shell and each engageable by a second end of a different one of said locking rods;
   whereby in response to operation of said lock by a key, said cam engages said push bar slot moving a first one of said first push bars in a first direction, and in response to said first push bar movement, said rocker bar moving a second one of said push bars in a second direction, the movement of said push bars in said first and second directions, respectively, causing said second ends of said connected locking bars to engage or in the alternative to disengage said strike plates in said rear shell to secure or in the alternative to provide access to an internal portion of said housing assembly.

2. A housing for a telephone paystation as claimed in claim 1 wherein:
   said lower shell and said rear shell are each of plastic construction, said lower shell and said rear shell ultrasonically welded together to form a shell for said lower housing assembly.

3. A housing for a telephone paystation as claimed in claim 1 wherein;

said first and second locking rod plates are secured to opposite vertical side walls of said upper housing assembly by bolts extending through a front wall of said housing assembly.

4. A housing for a telephone paystation as claimed in claim 1 wherein;
said first and second strike plates are secured to opposite vertical side walls of said rear shell by bolts extending through a rear wall of said housing assembly.

5. A housing for a telephone paystation as claimed in claim 1 wherein;
there is further included a bracket secured to a front wall of said upper housing assembly providing a pivot point for said rocker bar.

6. A housing for a telephone paystation as claimed in claim 5 wherein;
said bracket is bolted to said front wall of said upper housing assembly.

7. A housing for a telephone paystation as claimed in claim 1 wherein;
said first ends of said first and second locking rods are formed to a "U" shaped configuration.

8. A housing for a telephone paystation as claimed in claim 1 wherein;
said first and second locking rods second ends are each formed to an "L" shaped configuration.

9. A housing for a telephone paystation as claimed in claim 1 wherein;
said lower housing assembly further includes a base and a support for a coin vault within said telephone paystation housing.

10. A housing for a telephone paystation as claimed in claim 9 wherein;
said base for said vault is mounted by virtue of a plurality of brackets and a plurality of screws to the internal portion of said lower housing assembly.

* * * * *